United States Patent [19]

Schoeninger

[11] Patent Number: 5,165,179
[45] Date of Patent: Nov. 24, 1992

[54] WHEEL ALIGNMENT METHOD

[75] Inventor: Hilbert E. Schoeninger, Fenton, Mich.

[73] Assignee: General Motors Corporation, Detroit, Mich.

[21] Appl. No.: 703,984

[22] Filed: May 22, 1991

[51] Int. Cl.⁵ .................. G01B 5/255; G01B 7/315; G01B 11/275
[52] U.S. Cl. ...................................... 33/600; 33/203; 33/645
[58] Field of Search ................ 33/600, 608, 645, 203

[56] References Cited

U.S. PATENT DOCUMENTS

| | | | |
|---|---|---|---|
| 3,889,527 | 6/1975 | Wallace | 33/203 |
| 3,936,071 | 2/1976 | Ricketts, Jr. et al. | |
| 4,416,065 | 11/1983 | Hunter | 33/600 |
| 4,498,243 | 2/1985 | Kashiwagi | 33/600 |
| 4,977,524 | 12/1990 | Strege et al. | 33/203 |
| 5,040,303 | 8/1991 | Koerner | 33/203 |
| 5,105,546 | 4/1992 | Weise et al. | 33/600 |
| 5,105,547 | 4/1992 | Fujii | 33/203 |

Primary Examiner—William A. Cuchlinski, Jr.
Assistant Examiner—C. W. Fulton
Attorney, Agent, or Firm—Saul Schwartz

[57] ABSTRACT

A method of aligning front wheels of a vehicle so that the steering wheel of the vehicle is centered when the vehicle is driven including the steps of aligning the front wheels in centered positions corresponding to straight ahead driving while the steering wheel is immobilized in a centered position likewise corresponding to straight-ahead driving and then turning the steering wheel from a first off-center position through its centered position in a first direction and from a second off-center position through its centered position in an opposite second direction with at least a fraction of the weight of the vehicle on the front wheels. The method according to this invention further includes the steps of recording first and second off-center angles of the steering wheel relative to its centered position at the instants the front wheels achieve their centered positions as the steering wheel is turned in the first and second directions and then adjusting the front wheels relative to the steering wheel through equal included angles proportional to one half the difference between the first and second off-center angles of the steering wheel.

5 Claims, 1 Drawing Sheet

WHEEL ALIGNMENT METHOD

FIELD OF THE INVENTION

This invention relates to automotive steering systems.

BACKGROUND OF THE INVENTION

In the manufacture and assembly of automotive vehicles, the front wheel alignment procedure commonly involves immobilizing the steering wheel of the vehicle in a centered position corresponding to straight-ahead driving while the front wheels are aligned in their straight-ahead positions. The straight-ahead centered position of the steering wheel is characterized by symmetry about a vertical plane through the center of the steering wheel parallel to the centerline of the vehicle. When a vehicle is actually driven straight-ahead on a flat road, however, a driver may sense a different, non-symmetric centered position of the steering wheel due to compliance in the vehicles steering system. To correct that anomaly, technicians typically resort to trial and error realignment of the front wheels including immobilizing the steering wheel again in its symmetric centered position, readjusting the front wheels, and then test driving the vehicle. A method according to this invention of aligning the front wheels of an automotive vehicle maximizes the likelihood of achieving a symmetric centered position of the steering wheel with one wheel alignment and, therefore, minimizes the likelihood of additional, expensive realignments.

SUMMARY OF THE INVENTION

This invention is a new and improved method of aligning the front wheels of an automotive vehicle to achieve a symmetric centered position of a steering wheel of the vehicle when the vehicle is driven straight-ahead. In the method according to this invention, the steering wheel is immobilized in a symmetric centered position and the front wheels are aligned in centered positions corresponding to straight-ahead driving. With enough weight on the front wheels to create resistance to turning of the steering wheel, the latter is turned in a first direction from its symmetric centered position to an essentially arbitrary first off-center position and then back in an opposite second direction beyond the symmetric centered position. A first off-center angle of the steering wheel relative to its symmetric centered position is recorded when the front wheels achieve their centered positions as the steering wheel is turned in the second direction. The steering wheel is turned further in the second direction to an essentially arbitrary second off-center position and then back in the first direction beyond its symmetric centered position. A second angle of the steering wheel relative to its symmetric centered position is recorded when the front wheels achieve their centered positions as the steering wheel is turned in the first direction. The linkage between the steering wheel and the front wheels is then adjusted to pivot the front wheels about their steering axes relative to the steering wheel through equal included angles proportional to one half of the algebraic difference between the measured first and second off-center angles, the proportionality constant being determined by the steering ratio between the front wheels and the steering wheel and the direction being determined by the relative magnitudes of the off-center angles.

DESCRIPTION OF A PREFERRED EMBODIMENT

Figure 1:
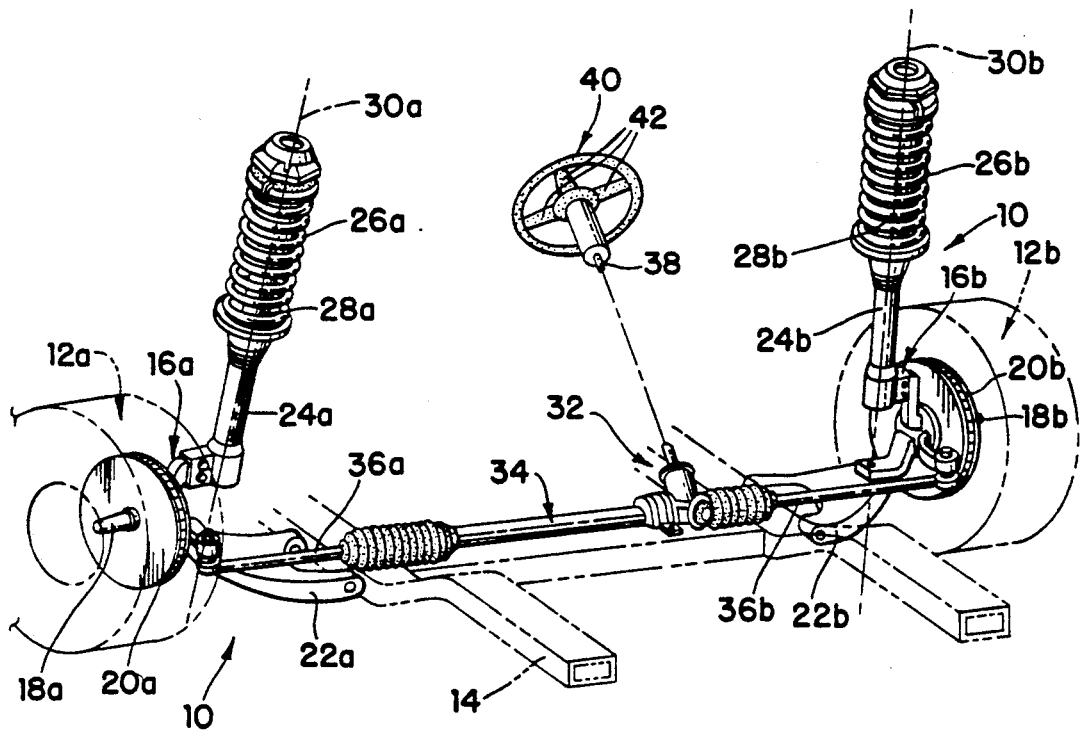
FIG. 1 is a fragmentary perspective view of an automobile steering system adapted for adjustment by a method according to this invention.
Figure 2:
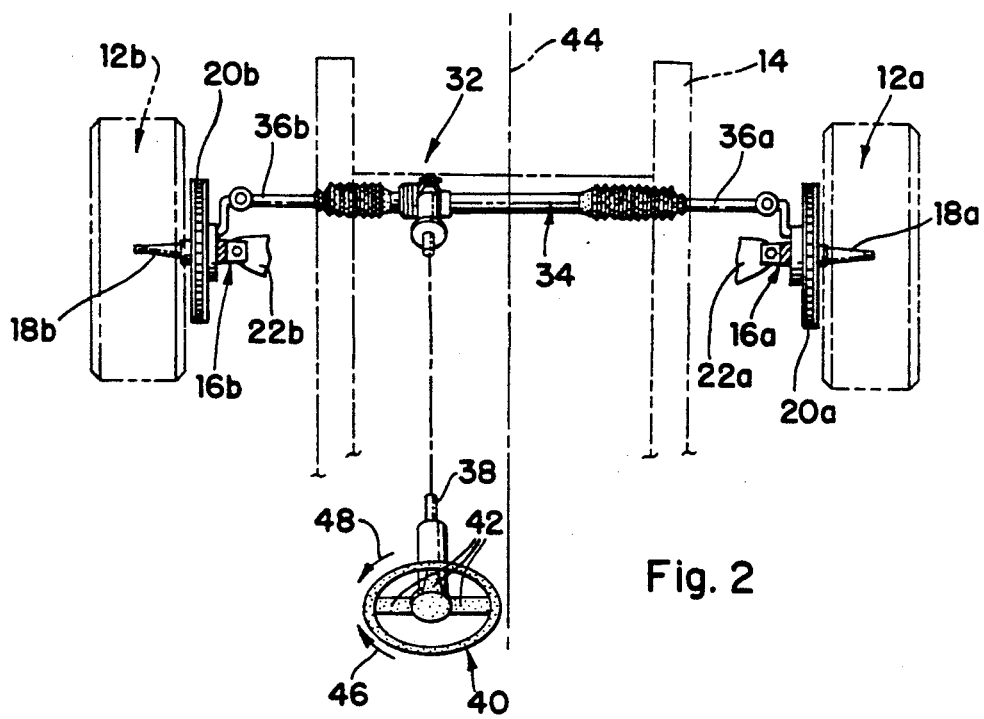
FIG. 2 is a schematic plan view of the steering system shown in FIG. 1.

Referring to FIGS. 1-2, a generic strut suspension system (10) for an automotive vehicle connects a pair of steerable front wheels (12A-B) of the vehicle to a schematically represented frame (14) of the vehicle. The wheels (12A-B) are referred to herein as front wheels for convenience but may be steerable rear wheels also. The strut suspension system (10) includes a pair of steering knuckle assemblies (16A-B) each having a wheel spindle (18A-B) and a brake rotor (20A-B) rotatable about the spindle and adapted for rigid attachment to respective ones of the front wheels (12A-B) in the usual fashion. The lower end of each steering knuckle assembly is connected to the frame (14) through one of a pair of lower control arms (22A-B).

The upper end of each steering knuckle assembly is rigidly connected to the lower end of one of a pair of damper tubes (24A-B). A pair of coil springs (26A-B) are disposed between the sprung mass of the vehicle, not shown, and seat on the damper tubes (24A-B) whereby the wheels (12A-B) support the sprung mass of the vehicle through the steering knuckles assemblies, the damper tubes, and the springs (26A-B) in conventional fashion. A pair of damper piston rods (28A-B), FIG. 1, inside the springs telescope into the damper tube (24A-B), respectively, and are connected to the sprung mass of the vehicle.

Spring seats, not shown, on the sprung mass of the vehicle are engaged by the upper ends of the coil springs (26A-B) and permit rotation of the springs and the damper tubes (24A-B) about respective ones of a pair of generally vertical steering axes (30A-B) defined by the spring seats and by swivel joints, not shown, between the lower control arms (22A-B) and the steering knuckle assemblies. Rotation of the damper tubes (24A-B) is accompanied by corresponding pivotal movement of the steering knuckle assemblies (16A-B) and front wheels (12A-B) about the steering axes (30A-B).

A generic steering system (32) of the vehicle controls the direction of the front wheels relative to the frame (14) in the usual manner. The steering system (32) includes a rack and pinion steering gear (34) disposed transversely on the frame (14), a pair of length-adjustable tie rods (36A-B) between opposite ends of the rack and pinion steering gear (34) and respective ones of the steering knuckle assemblies (16A-B), a steering shaft (38) connected to an input of the steering gear (34), and a steering wheel (40) rotatable as a unit with the steering shaft (38). When the steering wheel is turned, the steering gear shifts the tie rods laterally to pivot the steering knuckle assemblies about the steering axes (30A-B).

The steering wheel has a centered position, FIGS. 1-2, corresponding to straight ahead driving on flat roads. The centered position of the steering wheel is characterized by symmetry of a plurality of spokes (42) of the wheel about a vertical plane through the center of the wheel parallel to a longitudinal centerline (44), FIG. 2, of the vehicle. Likewise, the front wheels (12A-B)

have centered positions, FIGS. 1-2, corresponding to straight-ahead driving in which the planes of the front wheels are substantially parallel to a vertical, longitudinal centerplane of the vehicle. Substantial parallelism contemplates up to about 0.5 degrees of toe angle and up to about 0.8 degrees of camber angle of the front wheels (12A-B) relative to the centerplane of the vehicle.

Where the vehicle on which the steering system (32) is installed is a rear wheel drive vehicle, the centered positions of the front wheels (12A-B) are characterized by substantial parallelism between the planes of the front wheels and a vertical plane containing the thrust line of the rear wheels. While the vertical plane containing the thrust line of the rear wheels ideally coincides with the vertical centerplane of the vehicle, that condition may not obtain due to manufacturing tolerances. Determination of the direction of the thrust line of the rear wheels relative to the frame (14), and hence the direction of the vertical plane containing the same, is within the capability of conventional, commercially available alignment equipment and is, therefore, not further described herein.

Any sustained deviation of the steering wheel from its symmetric centered position when the vehicle is driven straight ahead is sensed by a driver as an anomaly requiring correction. A method according to this invention of aligning the front wheels of an automotive vehicle maximizes the likelihood of achieving a symmetric steering wheel centered position without resorting to trail and error realignments after initial vehicle assembly.

The method according to this invention of aligning the front wheels (12A-B) is described as follows.

1. The steering wheel (40) is immobilized or clamped in its symmetric centered position, FIGS. 1-2, corresponding to straight ahead driving on a flat road.

2. The lengths of the tie rods (36) are adjusted to align the front wheels (12A-B) in their centered positions corresponding to straight-ahead driving.

3. With the front wheels (12A-B) supporting enough of the weight of the vehicle to create resistance to turning of the steering wheel (40), the steering wheel (40) is turned in a first or right turn direction represented by a directional arrow (46), FIG. 2, from its centered position to an off-center, essentially arbitrary first intermediate position at least about 20 degrees from the centered position.

4. From the first intermediate position, the steering wheel (40) is turned in a continuous movement back in an opposite second or left turn direction represented by a directional arrow (48) from the first intermediate position to beyond its symmetric centered position. A first off-center angle of the steering wheel relative to its centered position is recorded at substantially the instant the front wheels (12A-B) achieve their centered positions. Of course, the first off-center angle is also found by measuring the angles of the front wheels (12A-B) relative to their straight-ahead positions at the instant the steering wheel (40) achieves its symmetric centered position. The first off-center angle is the product of compliance in the steering system and is accurately measurable as long as continuity of rotation of the steering wheel in the left turn direction is sustained.

5. With the front wheels (12A-B) still supporting enough of the weight of the vehicle to create resistance to turning of the steering wheel (40), the steering wheel (40) is turned in the left turn direction represented by the directional arrow (48), FIG. 2, from its centered position to an off-center, essentially arbitrary second intermediate position at least about 20 degrees from the centered position.

6. From the second intermediate position, the steering wheel (40) is turned in a continuous movement back in the opposite first or right turn direction represented by the directional arrow (46) from the second intermediate position to beyond its symmetric centered position. A second off-center angle of the steering wheel relative to its centered position is recorded at substantially the instant the front wheels achieve their centered positions. Of course, the second off-center angle is also found by measuring the angles of the front wheels (12A-B) relative to their straight-ahead positions at the instant the steering wheel (40) achieves its symmetric centered position. The second off-center angle is also the product of compliance in the steering system and is accurately measurable as long as continuity of rotation of the steering wheel in the right turn direction is sustained.

7. The algebraic difference between the first and second off-center angles of the steering wheel is computed and is arbitrarily positive or negative according to the relative magnitudes of the off-center angles of the steering wheel. Then, the lengths of the tie rods (36) are adjusted to pivot the front wheels about their respective steering axes (30A-B) through equal included angles proportional to one half of the algebraic difference between the first and the second off-center angles of the steering wheel (40). The proportionality constant applied to the algebraic difference between the off-center angles is determined by the steering ratio between the steering wheel (40) and the front wheels (12A-B).

For example, if the first off-center angle is 5.2 degrees and the second off-center angle is 6.4 degrees, and assuming off-center angles on the right turn side of the centered position of the steering wheel are positive and off-center angles on the left turn side of the centered position of the steering wheel are negative, the front wheels are pivoted about the respective steering axes through equal angular intervals proportional to $-0.6$ degrees, i.e. $(5.2-6.4)/2$.

The instruments for measuring and recording the off-center steering wheel angles and for monitoring the angles of the front wheels (12A-B) are all commercially available devices. The structures and operation of such devices form no part of this invention and descriptions of the same, therefore, have been omitted.

It has been observed experimentally that in vehicles having front wheels aligned by the method according to this invention, the steering wheel (40) more consistently assumes its centered position when the vehicle is driven straight-ahead on flat surfaces for the first time as compared to similar vehicles on which the front wheels are aligned by the traditional method of only adjusting the front wheels to their centered positions with the steering wheel immobilized in its centered position. The method according to this invention, therefore, may contribute to reduction in service expense associated with repetitious trial and error correction of the anomaly of an off-center steering wheel.

What is claimed is:

1. On a vehicle having a steerable wheel operative to support at least part of a sprung mass portion of said vehicle above a road, said steerable wheel being pivotable about a generally vertical steering axis of said vehicle and connected to a steering wheel of said vehicle by a steering linkage means defining a predetermined ratio relationship between an angular interval of steering wheel rotation and a corresponding angular interval of pivotal movement of said steerable wheel about said steering axis, a method of aligning said steerable wheel comprising the steps of:

immobilizing said steering wheel in a centered position corresponding to straight-ahead driving of said vehicle, adjusting said steering linkage means to align said steerable wheel in a centered position corresponding to straight-ahead driving, supporting at least a fraction of a sprung mass portion of said vehicle on said steerable wheel to develop resistance to turning of said steering wheel, turning said steering wheel from said centered position thereof in a first direction to a first intermediate position and then turning said steering wheel continuously in an opposite second direction from said first intermediate position to beyond said centered position of said steering wheel, recording a first off-center angle of one of said steering wheel relative to said centered position thereof when said steerable wheel achieves said centered position thereof and said steerable wheel relative to said centered position thereof when said steering wheel achieves said centered position thereof while said steering wheel is continuously turned in said second direction from said first intermediate position thereof, turning said steering wheel from said centered position thereof in said second direction to a second intermediate position and then turning said steering wheel continuously back in said first direction from said second intermediate position to beyond said centered position of said steering wheel, recording a second off-center angle of one of said steering wheel relative to said centered position thereof when said steerable wheel achieves said centered position thereof and said steerable wheel relative to said centered position thereof when said steering wheel achieves said centered position thereof while said steering wheel is continuously turned in said first direction from said second intermediate position thereof, computing said algebraic difference between said first and said second off-center angles, and adjusting said steering linkage means to pivot said steerable wheel about said steering axis relative to said steering wheel through an included angle proportional to one-half the algebraic difference between said first and said second off-center angles.

2. The method recited in claim 1 wherein each of said first and said second of is an off-center angle of said steering wheel recorded when said steerable wheel achieves said centered position thereof.

3. The method recited in claim 2 wherein said proportionality constant applied to one-half the algebraic difference between said first and said second off-center angles of said steering wheel is a function of said ratio relationship established by said steering linkage means.

4. The method recited in claim 3 wherein said steerable wheel in said centered position thereof corresponding to straight-ahead driving of said vehicle is substantially parallel to a vertical longitudinal centerplane of said vehicle.

5. The method recited in claim 3 wherein
said steerable wheel is a front wheel of said vehicle,
said vehicle includes a pair of rear drive wheels, and
said steerable wheel is substantially parallel to a vertical plane containing a thrust line of said pair of rear drive wheels when said steerable wheel is in said centered position thereof corresponding to straight-ahead driving of said vehicle.

* * * * *